United States Patent [19]

Briley

[11] Patent Number: 4,523,437
[45] Date of Patent: Jun. 18, 1985

[54] VEHICLE AIR CONDITIONING SYSTEM

[75] Inventor: Patrick B. Briley, Stillwater, Okla.

[73] Assignee: Hybrid Energy Systems, Inc., Stillwater, Okla.

[21] Appl. No.: 341,239

[22] Filed: Jan. 21, 1982

Related U.S. Application Data

[63] Continuation-in-part of Ser. No. 196,864, Oct. 14, 1980, Pat. No. 4,374,467, which is a continuation of Ser. No. 55,524, Jul. 9, 1979, Pat. No. 4,248,049, which is a continuation-in-part of Ser. No. 948,043, Oct. 2, 1978, abandoned.

[51] Int. Cl.³ ............................................. F25B 27/02
[52] U.S. Cl. ...................................... 62/238.4; 62/500
[58] Field of Search ...................... 62/238.4, 500, 239

[56] References Cited

U.S. PATENT DOCUMENTS

| | | | |
|---|---|---|---|
| 2,852,922 | 9/1958 | Neumann et al. | 62/500 |
| 3,500,897 | 3/1970 | Von Cabe | 62/500 X |
| 3,602,295 | 8/1971 | Klaas | 62/500 X |
| 4,007,776 | 2/1977 | Alkasab | 62/500 X |
| 4,164,850 | 8/1979 | Lowi, Jr. | 62/238.4 X |
| 4,301,662 | 11/1981 | Whitnah | 62/238.4 |
| 4,342,200 | 8/1982 | Lowi, Jr. | 62/500 X |
| 4,345,440 | 8/1982 | Allen | 62/500 X |

Primary Examiner—Lloyd L. King
Attorney, Agent, or Firm—Chris H. Morgan

[57] ABSTRACT

An air conditioning system for a vehicle of the type having an engine which produces heat conveyed from the engine by an exhaust system, a water circulation system and an oil circulation system, comprising a heat engine including a refrigerant circulation system and a refrigerant circulation subsystem. The refrigerant circulation system is connected to at least one of the heat conveying systems from the engine such that the refrigerant in the refrigerant circulation system is heated. The heat so received drives the refrigerant in the refrigerant circulation subsystem by means of an ejector. Expansion of refrigerant in the refrigerant circulation subsystem provides air conditioning through a load evaporator. The refrigerant circulation system is preferably connected to the vehicle engine to obtain synergistic use of the engine water pump, radiator fan, oil circulation system and exhaust circulation system.

19 Claims, 3 Drawing Figures

VEHICLE AIR CONDITIONING SYSTEM

RELATED APPLICATIONS

The present invention is a Continuation-In-Part of U.S. patent application Ser. No. 196,864, filed Oct. 14, 1980, now U.S. Pat. No. 4,374,467, which is a Continuation of U.S. patent application Ser. No. 55,524 filed July 9, 1979 and issued Feb. 3, 1981 as U.S. Pat. No. 4,248,049, which in turn is a Continuation-In-Part of U.S. patent application Ser. No. 948,043 filed Oct. 2, 1978, and now abandoned.

The above-indicated related applications describe temperature conditioning systems which employ an ejector-type compressor, and more particularly, such a system which utilizes heat energy from a relatively low temperature heat source for heating and/or cooling. In this system an energy source is used to evaporate a refrigerant in a boiler. The expanded gases from the boiler serve as the motive fluid in an ejector-type compressor. The outlet of the ejector is connectect to a condenser which cools the fluid which is then expanded through an expansion valve producing further cooling. The cooled fluid is then passed through an evaporator. The suction inlet of the ejector is connected downstream of the condenser. A drive pump is also connected downstream of the condenser and returns refrigerant to the boiler.

BACKGROUND OF THE INVENTION

1. Field of the Invention

The present invention relates, in general, to air conditioning systems for vehicles and more particularly to air conditioning systems for vehicles with engines which produce heat as they provide mechanical work.

2. Description of the Prior Art

In the past, air conditioners used on vehicles such as cars and trucks have not been entirely satisfactory. A particular problem with these air conditioners has been that the elements of the air conditioner are located in a heated environment, namely the engine compartment. The heat from the engine heats the elements of the air conditioner and makes the cooling provided by the air conditioner less efficient.

This is especially true when the outside temperature is higher than normal making the engine compartment hotter than normal. Of course, when the outside temperature is greater, the need for cooling the car interior by an air conditioner is also greater. This causes the air conditioner to be least efficient when the need for the cooling from the air conditioner is greatest. This inefficiency in turn causes a greater load to be placed on the car engine further heating the engine and increasing the inefficiency of the air conditioner. The load placed on a vehicle's engine to operate these inefficient air conditioners has led to reduced available engine power and increased gasoline consumption by the engines. This loss in horsepower is significant when air conditioners are used on small vehicles designed with low horsepower engines for gasoline savings. Further, this loss in horsepower for a small vehicle can be hazardous for passing and pulling loads to the extent that air conditioners are not recommended in small vehicles.

While absorption type air conditioning and heating systems utilizing low temperature energy sources are known, usually these systems are too heavy and too large to be used in a vehicle.

One engine cooling system and air conditioning system is shown in U.S. Pat. No. 4,164,850 to Lowi. This patent describes a new type of cooling system for a car engine combined with a a low temperature heat engine air conditioning system. The engine cooling system comprises engine and exhaust manifold jackets through which a refrigerant (such as freon) is circulated. This refrigerant fluid is conducted in four different paths, depending on the mode of the system, to achieve either fast heating of the engine, air conditioning of the car with cooling of the engine, heating of the car with cooling of the engine, or cooling of the engine alone. In the mode for air conditioning of the car and cooling of the engine, refrigerant is heated in the engine and exhaust manifold jackets. This heated refrigerant is then conveyed through an ejector which induces flow of this refrigerant in a low pressure evaporation air conditioning cycle. Some of the refrigerant is then repressurized by a pump and circulated for heating to the engine and exhaust jackets.

As can be seen, the Lowi patent describes an air conditioning system which replaces the conventional water cooling system of a car with a refrigerant circulated through engine and exhaust jackets. Moreover, this system requires at least four circulation modes to allow heating, cooling and neither heating or cooling to occur while not overheating the engine. Of course, if a freon leak occurs (which is much more likely than a water leak because freon is gaseous and must be held under pressure at room temperature) loss of the ability to cool the engine occurs as well. There are several serious disadvantages to the system described in the Lowi patent which are due to circulation of hydrocarbon type refrigerants directly through the engine block and exhaust manifold jackets. The refrigerant in Lowi's system could become contaminated with oil, grease, fine metal fragments and other materials from the engine. Prolonged contact of the refrigerant in the presence of even low levels of moisture at the elevated surface metal temperatures of the exhaust manifold and engine would degrade hydrocarbon refrigerants. The presence of these jackets would also increase access and maintenance problems when the engine needed repair or servicing. Also a large volume around the engine would be taken up by the jackets since the jackets would have to be large enough to provide the necessary heat transfer area to remove heat from the engine.

SUMMARY OF THE INVENTION

By means of the present invention an air conditioning system capable of utilizing a low temperature heat source is combined with a vehicle engine cooling system already equipped with many of the parts required by the air conditioning system such as fans, blowers, coolant circulation means, engine heat source and outside air cooling (provided by radiator fan and movement of the vehicle). All of this is accomplished while at the same time reducing the normally required mechanical engine load to provide air conditioning for cooling the interior of the car and cooling for the vehicle engine. What is particularly desirable about the combination of the present invention is that most vehicle coolant temperatures and exhaust temperatures are sufficient to operate the low temperature air conditioning system and at the same time keep the size and weight of the air conditioning system small enough for practical use on the vehicle. Accordingly, a desirable feature of the system of this invention is that air conditioning and/or refrigeration for a vehicle can be provided with little and in some cases no increase in the consumption of fuel to run the vehicle engine. Therefore, significant reductions in fuel consumption are provided over other vehicle air conditioning systems.

By the present invention it has been discovered that the systems described in my U.S. Pat. No. 4,248,049 and my U.S. patent application Ser. Nos. 948,043 and 196,864, filed Oct. 2, 1978, and Oct. 14, 1980, respectively, can be uniquely combined with vehicles whose engines produce heat. Particularly, the present invention utilizes the heat from such engines to drive a cooling system which combines elements of a conventional car engine with elements of the described system to achieve a more compact and efficient system. In other words, the present invention provides a unique and commerically useful air conditioner for a car or the like where the prior art or combinations of the prior art could not do so.

The vehicle air conditioning system of the present invention is connected for receiving heat from the engine which powers the vehicle. The system comprises a boiler which is connected in a heat exchanging relationship with a conventional engine. A drive pump for pumping the refrigerant is connected to the inlet of the boiler. The outlet of the boiler is connected to the drive inlet of an ejector such that the fluid from the boiler serves as the motive fluid for the ejector. A condenser is connected in a heat exchanging relationship with a heat sink and receives refrigerant from the diffuser and outlet portion of the ejector. The outlet portion of the condenser is connected to the inlet of the drive pump.

A load evaporator is connected in a heat exchanging relationship for cooling air inside the vehicle. The load evaporator receives refrigerant from the outlet portion of the condenser. The outlet portion of the evaporator is connected to the suction inlet of the ejector. This recompresses the refrigerant for recycling in the refrigeration cycle described.

Preferably, the boiler is connected for receiving heat from one or more of the fluids which pass through the engine. Thus, the boiler can be connected to the water circulation system which cools the engine, the hot exhaust system, the oil circulation system which lubricates and cools the engine, or combinations of all three systems. The hottest system may be used to start up the boiler. The conventional water pump in the engine cooling system can circulate the heated cooling water through the boiler. Air moved by the conventional radiator fan can cool the condenser if the condenser is located in series with the radiator or if the entire radiator is replaced by the condenser.

As is readily apparent, the air conditioning system cools the engine by removal of heat in the boiler. In fact, in one embodiment, the circulation system of the air conditioning system can be used to completely replace or reduce in size the radiator which would normally cool the engine; and with selection of a refrigerant with the proper pressure characteristics, the existing radiator can be used as the condenser for the air conditioning system. Furthermore, the system of this invention can be retrofitted into existing conventional car air conditioning systems which are already installed thereby saving equipment costs while still achieving large reductions in horsepower requirements to provide air conditioning. In fact, the existing mechanical compressor can be used to augment the refrigerant gas compression performed by the ejector. Accordingly, the present invention is a dramatic improvement over the conventional air conditioning systems because engine heat and gasoline consumption are reduced by the elimination of the extra horsepower needed to operate the mechanical compressor of a conventional air conditioning system. More importantly, the present invention combines with a conventional engine and conventional engine equipment in a synergistic manner so that the engine operates and cools conventionally but this cooling is augmented at the same time air conditioning is provided.

As described, the present invention combines an air conditioning system suitable for use with a low temperature heat source with a vehicle engine cooling system already equipped with many of the parts required by the air conditioning system such as fans, blowers and coolant circulation pumps. The engine acts as a heat source and cooling is provided by the radiator fan and movement of the vehicle. This combination provides reduced mechanical engine load and efficient air conditioning. The coolant and exhaust temperatures of most vehicles are sufficient to operate this system and to keep its size and weight within practical limits. In fact, in many vehicles air conditioning or refrigeration can be provided with very little or no increase in fuel consumption compared to such vehicles without air conditioning. Of course, there are similarly fuel consumption reductions in such vehicles where the present system replaces conventional air conditioning systems.

For a further understanding of the invention and further objects, features and advantages thereof, reference may now be had to the following description taken in conjunction with the accompanying drawings.

DESCRIPTION OF THE PREFERRED EMBODIMENTS

The term "temperature conditioning system" as used herein is to be understood to mean a system that absorbs (for cooling) and/or rejects (for heating) heat energy at a range of desired design temperatures.

Figure 1:
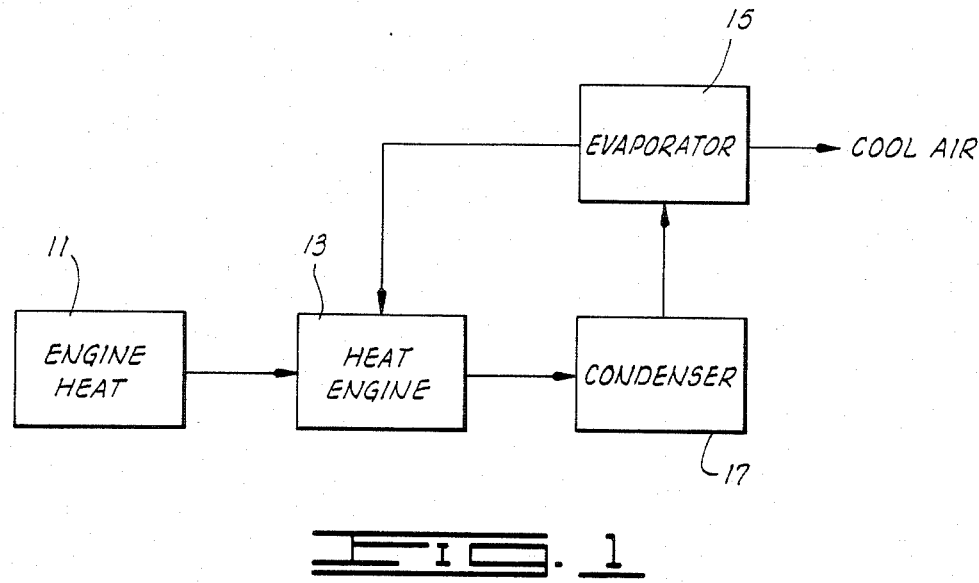
FIG. 1 illustrates in schematic form a broad conceptual flow diagram of the system of the present invention.

Referring now to FIG. 1, a broad conceptual flow diagram of the present invention is shown in schematic form. As shown, the present invention utilizes engine heat 11 (the temperature difference between the engine, its coolants, exhaust, or lubricants and the outside air (or other heat sink, if available) to drive the cooling system. Particularly, heat from the engine powers a heat engine 13 of a type described in more detail below. Of course, since the temperature difference between the engine and the outside air is not sufficient to efficiently drive all types of heat engines, the heat engine 13 must be of a type capable of utilizing a relatively low temperature heat source.

The heat engine 13 powers the air conditioning system by cooling a refrigerant (by expansion, e.g.) and circulating the cooled refrigerant to an evaporator 15.

Heat exchange with the evaporator produces cool air which is circulated inside the car.

As shown in FIG. 1, the heat engine 13 cools a refrigerant by compressing the refrigerant, circulating the refrigerant through a condenser 17 and then expanding the compressed refrigerant. The expanded and cooled refrigerant is then conveyed to the evaporator 15 for heat exchange as described. Of course, this form of refrigerant circulation is used in all forms of refrigerant air conditioners. However, the vehicle air conditioner of the present invention differs from conventional compression systems mechanically connected to the engine for compressing the refrigerant. The present system, in contrast, utilizes heat from the engine to achieve this compression, or at least a portion of this compression. More importantly, the present invention utilizes a heat engine for achieving this compression which combines with conventional parts of an engine producing an efficient, relative low weight, and compact air conditioning system.

Figure 2:
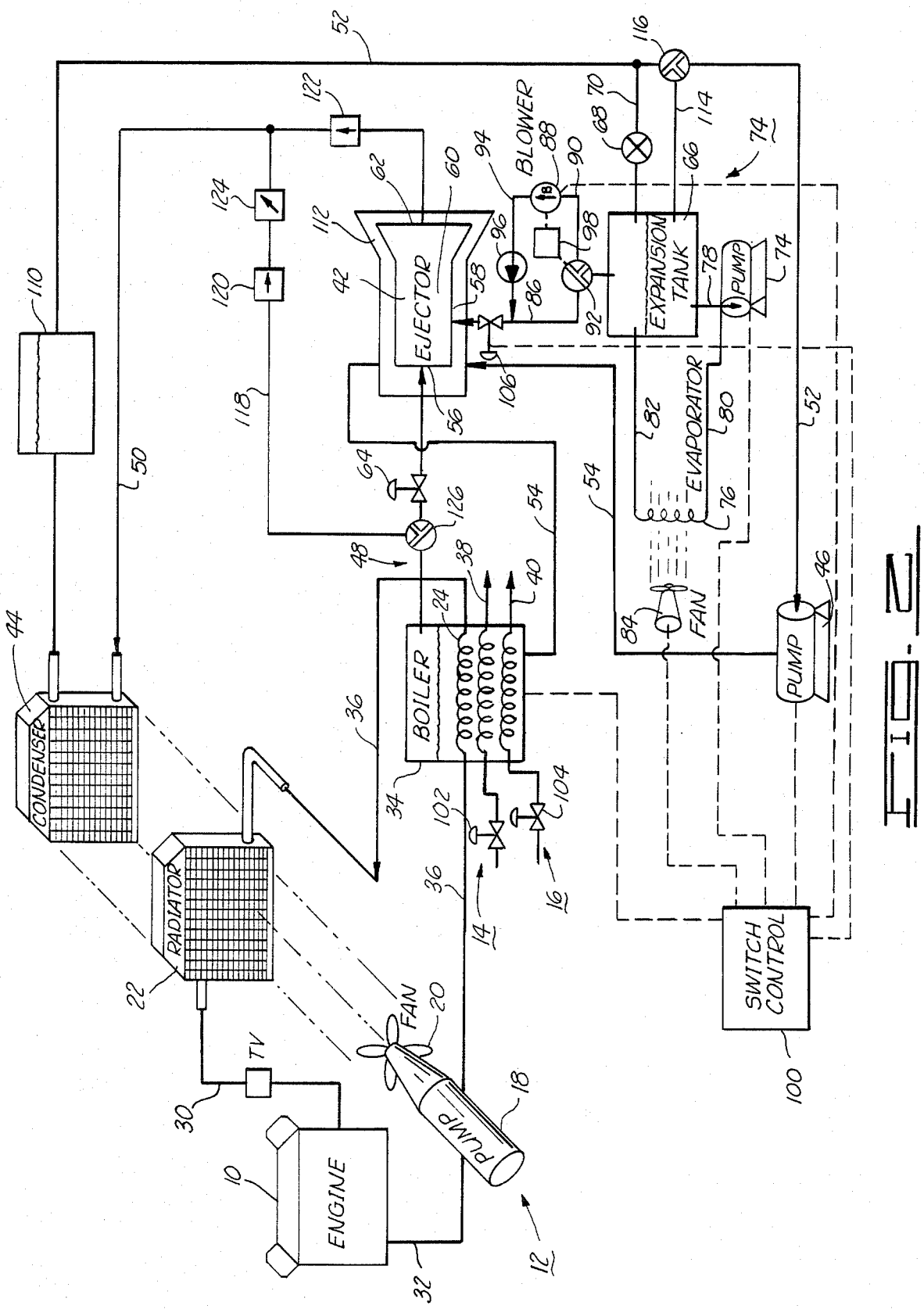
FIG. 2 illustrates in schematic form a vehicle temperature conditioning system constructed in accordance with one embodiment of the present invention.

Referring now to FIG. 2, an embodiment of the present invention is shown schematically. The vehicle of which this invention is a part is not shown for convenience in displaying the invention. The location of the particular elements within the vehicle, if not specified, is conventional and within the skill of the art.

In this invention, heat is provided from the engine 10 which powers the vehicle. Typically, the engine 10 is an internal combustion engine having a water circulation system 12 for cooling the engine, and an engine exhaust system 16 for conveying heated exhaust gases from combustion of the fuel within the engine.

The elements of the vehicle water circulation system 12 are shown in further detail in FIG. 2. A pump 18 is provided for circulating water through the system. The pump 18 is connected to a fan 20 which moves air through radiator 22. Conventionally, the outlet of pump 18 is connected directly to the inlet of radiator 22 and the outlet of radiator 22 is connected by conduit 30 to an inlet of the engine 10. A conduit 32 connects an outlet of the engine 10 to the inlet of pump 18.

The vehicle water circulation system 12 is usually present on most vehicles except that in the present invention the water circulation system 12 is connected in a heat exchange relationship with a boiler 34 via conduits 36 and boiler coil 24. Boiler 34 contains a refrigerant used in the refrigerant cycle described below. A conduit 36 conveys water in the circulation system 12 through boiler coil 24 for heating the refrigerant in boiler 34. One end of conduit 36 is connected to water pump 18 and the other end of conduit 36 is connected to the radiator 22. In this arrangement heat is removed from the cooling water circulated through boiler coil 24 and radiator 22.

As shown in FIG. 2, also connected for heat exchange through boiler 34 is an oil circulation system conduit 38 and an engine exhaust system conduit 40. As described in more detail below, the water circulation system 12, the oil circulation system 14, and the engine exhaust system 16 may each be used alone or in combination for transferring heat to the refrigerant in boiler 34. Since exhaust temperatures are higher and reach a maximum much more quickly than engine cooling water, the exhaust could be used to start up the boiler and the present air conditioning system more quickly. In a combined mode, exhaust would heat the boiler initially until the engine coolant and/or oil temperature became high enough, then the engine coolant and/or oil would be used to heat the boiler, with or without continued use of the engine exhaust.

Boiler 34 is one element in a refrigerant compression loop 42. This compression loop is comprised primarily of boiler 34, ejector 42, condenser 44, and drive pump 46. Each of these elements is described in more detail in my U.S Pat. No. 4,248,049. In this compression loop 41, refrigerant evaporated in boiler 34 is conveyed to ejector 42 through a conduit 48. The outlet of ejector 42 is connected to the inlet of condenser 44 by a conduit 50. The outlet of condenser 44 is connected to the inlet of drive pump 46 by a conduit 52. Finally, the outlet of drive pump 46 is connected to the inlet of boiler 34 by a conduit 54. Usually pump 46 will be started whenever engine 10 is started and will remain on as long as engine 10 is on and heat is being rejected to refrigerant in boiler 34 by the engine water circulation system. This can reduce the size of radiator 22 since heat transferred to the boiler 34 will be removed by condensor 44 even when air conditioning is not being provided by evaporator 76. Also, pump 46 could be started only when air conditioning is desired if refrigerant in boiler 34 is solely heated by some means such as hot oil or engine exhaust other than the water circulation system 12. Of course, if no engine cooling by way of condenser 44 is desired, pump 46 could be started also only when air conditioning is wanted and hot water from the engine 10 is heating boiler 34.

The ejector 42 has a drive inlet portion 56, a suction inlet portion 58, a mixing portion 60, and a diffuser or outlet portion 62. The ejector 42, sometimes referred to in the art as a jet pump or a jet compressor, operates in a well-known manner to compress the relatively low temperature and pressure fluid drawn into the ejector through the suction inlet 58. The mechanical energy of the fluid entering the drive inlet 56 drives this compression.

As described above, the refrigerant evaporated in boiler 34 enters the drive inlet of ejector 42 through conduit 48. The flow and/or pressure of refrigerant through a conduit 48 can be regulated by a valve 64 on conduit 48. Thus, the refrigerant evaporated in boiler 34 is the motive fluid for ejector 42.

A bypass conduit 118 is provided from conduit 48, upstream of valve 64, to conduit 50 around ejector 42. Conduit 118 is connected to conduits 48 and 50 by a three way valve 126. Also shown in FIG. 2 is an excess flow check valve 120 connected to control flow of refrigerant in conduit 118. Check valve 120 could be used in place of three way valve 126 to save costs and to simplify the control system needed for operating the air conditioning system. Excess flow check valves are well known and operate to prevent flow in one direction when flow exceeds a predetermined rate. The excess flow check valve 120 will permit refrigerant gas to bypass ejector 42 until the generation rate of refrigerant gas in boiler 34 becomes high enough to prevent liquid refrigerant from overflowing the boiler 34 and the resulting two phase flow from entering ejector 42.

An ordinary check valve 124 can be used downstream of excess flow check valve 120 to prevent refrigerant from conduit 50 from flowing into conduit 118 and through valve 120 in the wrong direction. A check valve 122 is placed immediately downstream of ejector 42 to prevent flow from conduit 118 through ejector 42. With the use of three way valve 126 instead of valve 120, flow can be directed from conduit 48 to conduit 50 solely through ejector 42 or alternatively, from conduit 48 to conduit 50 through conduit 118 thereby bypassing ejector 42.

The suction inlet 58 of ejector 42 is connected to an expansion tank 66 by conduit 86. Control valve 106 is on conduit 86 upstream of ejector suction 58 to stop flow into suction inlet 58 when air conditioning is not being provided by load evaporator 76. Expansion tank 66 is also connected to conduit 52 by a conduit 70. The expansion tank 66 serves as a reservoir for refrigerant which has been cooled by expansion after leaving condenser 44. Tank 66 also serves to separate the liquid and gas phases of refrigerant. This expansion is achieved through an expansion valve 68 on conduit 70. The inlet of conduit 70 is connected to conduit 52 and the outlet of conduit 70 is connected to an inlet of expansion tank 66.

Expansion tank 66 forms a portion of a refrigeration loop 72. The refrigeration loop 72 is comprised primarily of expansion tank 66, a load pump 74 and a load evaporator 76. The load pump 74 is connected to a lower portion of the expansion tank 66 by a conduit 78. In this manner, liquid refrigerant in expansion tank 66 is moved through the loop 72. The outlet of pump 74 is connected to the inlet of load evaporator 76 by a conduit 80. The outlet of evaporator 76 is connected to an inlet of expansion tank 66 by a conduit 82.

Conduit 114 connects the part of the expansion tank 66 containing liquid refrigerant to three-way valve 116 in conduit 152. The position of valve 116 can be selected to permit all the refrigerant entering pump 46 to come solely from condenser 44 or solely from the expansion tank 66. The temperature of the refrigerant from tank 66 is lower than that from condenser 44. Circulation of this lower temperature refrigerant from tank 66 by pump 46 through conduit 54 and ejector jacket 112 will increase the efficiency of ejector 42 even more than circulation of the warmer refrigerant from condenser 44.

An alternate embodiment (not shown) has the portion of the conduit 70 downstream of valve 68 connected directly to the inlet of evaporator 76 via conduit 80. Conduit 82 would be connected either to conduit 86 between valves 92 and 106 if blower 88 is not used or directly to valve 92 if blower 88 is used. In this configuration a load pump and an expansion tank may or may not be used.

Each of the elements in refrigeration loop 72 is described in more detail in my U.S. Pat. No. 4,248,049. In the present invention, evaporator 76 is disposed adjacent a fan 84. Fan 84 blows air over the evaporator coil 76 into the interior of the vehicle and/or into any enclosed space attached to the vehicle. This provides cooling for the interior of the vehicle or, for example, refrigeration for an icebox inside a camper or a refrigerated truck. Placement of the fan 84 and the evaporator 76 in the vehicle can be that of a conventional air conditioning system.

As described above, expansion tank 66 is connected to the suction inlet 58 of ejector 42 by a conduit 86. Preferably, this connection is made such that refrigerant substantially in the vapor phase enters conduit 86. Connected in parallel with conduit 86 is a blower 88. The blower 88 can increase the amount of cooling in refrigeration loop 72 by decreasing the pressure in expansion tank 66. Alternatively, for the same amount of cooling and a constant tank 66 pressure, blower 88 can also be operated continuously (whenever air conditioning is wanted) to increase the suction pressure at the suction side of ejector 42. This will reduce the flow rate required to the motive side of ejector 42, thereby decreasing the size of the condenser 44. If limited space is available near the engine for the radiator 22 and condensor 44, use of the blower 88 to reduce the condenser 44 size could be important and advantageous. Blower 88 is connected by a conduit 90 and a three-way valve 92 to conduit 86. The outlet of blower 88 is connected by a conduit 94 to conduit 86 downstream of valve 92. A check valve 96 on conduit 94 prevents flow toward the blower through conduit 94.

As described in my U.S. Pat. No. 4,248,049, the actuation of blower 88 and three-way valve 92 can be controlled by a blower control 98. The actuation of blower 88 can be triggered to increase the amount of cooling to evaporator 76. The blower 88 can also be run continuously even at different speeds when air conditioning is wanted and when the condenser 44 temperature increases. Without the use of blower 88, if the condenser 44 temperature and pressure increases the amount of suction flow into the ejector would decrease for a fixed ejector drive flow and pressure and thereby reduce the cooling to the evaporator 76. At higher outside air temperatures, actuation of blower 88 can increase suction flow into the ejector 42 and thereby maintain the same amount of cooling to the evaporator 76.

The actuation of blower 88 can be triggered by a sensing device in expansion tank 66, boiler 34 or condenser 44. This sensing device can sense pressure, temperature level, flow, etc., in expansion tank 66 or condenser 44 to achieve these desired results.

Actuation of blower 88 is particularly useful when the temperature in boiler 34 is lower than the optimum temperature desired. Such a lower boiler temperature might typically occur when the engine has just recently been started. If desired, the blower 88 could automatically be actuated by the air conditioning on/off switch since conditions in the expansion tank at start-up could activate the blower. The existing mechanical compressor of an already installed conventional air conditioning system could be used as the blower 88 (even if different refrigerants are used) to augment the ejector 42. The horsepower required to operate the existing mechanical compressor and still provide the same amount of air conditioning would be significantly less since ejector 42 augments the required level of compression. In addition, blower 88 can be used without an expansion tank 66 in which case, as described earlier as an alternate embodiment (not shown), conduit 82 would be connected directly to valve 92 and the part of conduit 70 downstream of expansion valve 68 would be connected to the inlet of evaporator 76.

To actuate cooling in evaporator 76 by the air conditioning system a switch and control 100 is provided. This switch and control 100 can be connected to valves 106 and 126 (if valve 120 is not used), blower control 98, load pump 74, and boiler 34. Of course, there are many ways to actuate the system for cooling. For example, when the switch control 100 is turned on, it signals valve 106 to open thereby permitting refrigerant to pass into evaporator 76. If valve 126 is used instead of valve 120, switch control 100 can be programmed to signal valve 126 to move to a position permitting refrigerant gas to flow into ejector 42 from boiler 34 once the temperature of refrigerant in boiler 34 becomes high enough to prevent two phase flow through ejector 42. Turning switch 100 on also turns on pump 74 and fan 84. At the same time as valve 126 is moved to permit flow through the ejector 42, the blower control 98 can be activated by switch 100. If valve 120 is used instead of valve 126, blower control 98 would still be activated by switch control 100 once the temperature of refrigerant in boiler 34 becomes high enough.

Similarly, the flow of heated oil through conduit 38 or engine exhaust through conduit 40 can be controlled by valves 102 and 104, respectively, to heat the refrigerant in boiler 34 and permit faster initial heat-up of the boiler to begin the refrigeration cycle.

If heated oil or engine exhaust are used instead of engine cooling water to drive boiler 34, the drive pump 46 would only need to be operated when air conditioning was wanted. In this case switch control 100 would also be connected to turn drive pump 46 on and off. When relying primarily on engine cooling water to drive boiler 34, the choice as to whether to run drive pump 46 continuously or only when air conditioning is wanted will depend on whether or not the air conditioning system is being relied on to reject engine heat through condenser 44 to outside air.

Also, flow through conduit 48 from the boiler 34 to ejector 42 can be reduced or delayed by valve 64 until the temperature or pressure in boiler 34 is sufficiently high.

As shown in FIG. 2, a surge tank 110 is provided on conduit 52 to ensure that the refrigerant supplied to pump 46 is liquid. Surge tank 110 also works to dampen out sudden fluctuations in the system due to rapid temperature changes or the like.

Improving the efficiency of ejector 42 is an ejector jacket 112. Ejector jacket 112 is connected to conduit 54 such that the liquid refrigerant in conduit 54 is conveyed in a heat exchange relationship with the ejector 42. As described in my U.S. Pat. No. 4,248,049, this cools the ejector diffusor improving ejector efficiency.

As shown in FIG. 2, it is desirable to locate the condenser 44 in front of radiator 22 such that fan 20 draws air through the radiator 22 as well as condenser 44. This prevents the necessity of two fans. Although the temperature of air passing through the radiator is higher with the condenser present, the size of radiator 22 will not increase and may decrease since the heat load on the radiator is reduced by the air conditioning system. The radiator size depends on the maximum amount of cooling needed by the engine and the amount of heat removed from the engine cooling system to operate the air conditioning system.

Pumps 46 and 74 can be driven by the engine 10 or electrically driven through the car's electrical system. Which is most desirable depends on design factors such as pump pressure, capacity, etc.

In the combination of the present invention the horsepower loading on the engine by the drive pump 46 only slightly increases as the outside air and hence engine temperature increases. As the engine temperature increases, the engine coolant temperature increases, and the boiler temperature and pressure increase. The drive pump pressure therefore increases slightly which increases the load on the engine. However, the load on the engine is considerably less than a mechanical compressor to achieve the same amount of cooling. Since the ejector drive inlet 56 is connected to the boiler 34, the ejector inlet pressure and outlet pressure increase as the boiler pressure increases. This increased outlet pressure enables condensing in the condenser at the higher air temperature. This somewhat self-compensates for the higher outside air temperature.

When air conditioning is not wanted but engine cooling is being provided by rejection of heat in radiator 22 and condenser 44, the horsepower for operating drive pump 46 is even less so long as valve 106 is closed. Closing valve 106 stops flow of refrigerant gas into the ejector suction 58 and significantly decreases the pressure drop between the ejector motive inlet 56 and ejector discharge outlet 62 thereby reducing the discharge pressure and horsepower usage of drive pump 46.

Figure 3:
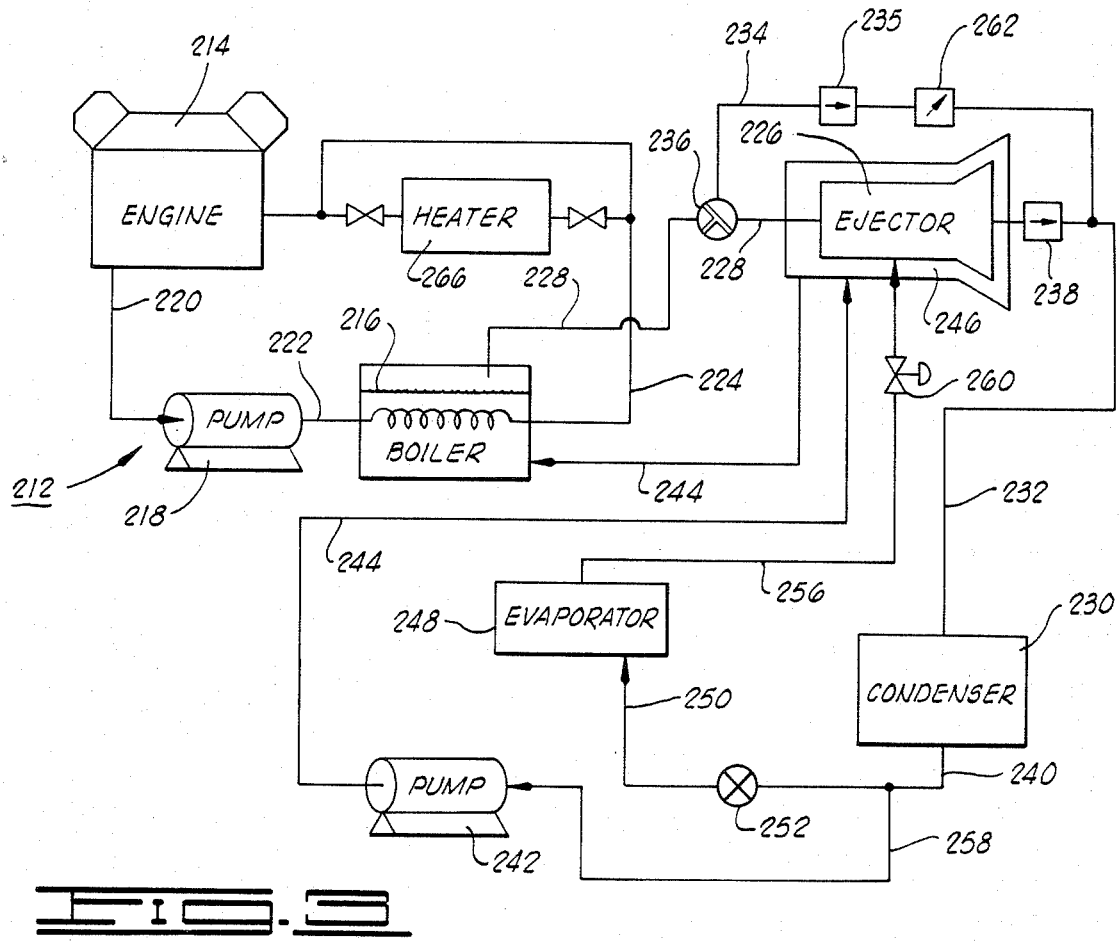
FIG. 3 illustrates in schematic form a vehicle temperature conditioning system constructed in accordance with a second embodiment of the present invention.

Referring now to FIG. 3, an alternative embodiment of the present invention is shown. In this embodiment the air conditioning system of the present invention eliminates the necessity for a radiator such as radiator 22 shown in FIG. 2. This is made possible by sizing ejector 226 and condenser 230 to provide the desired amount of cooling for air conditioning and/or refrigeration with the full heat load normally applied to the radiator.

In this embodiment the refrigerant pump 242 would be run continuously to provide engine cooling by rejection of heat in condensor 44 even if air conditioning is not wanted and cooling is not being provided by evaporator 248.

The proper sizing of ejectors chosen for this embodiment or the embodiments described above is affected by many parameters including the heat available to drive the ejectors. Proper sizing of the ejector will, therefore, be required for each particular system. Size of ejector here means any combination of ejector nozzle throat diameter, ejector diffusor throat diameter and ejector suction diameter.

In the embodiment shown in FIG. 3, the engine water circulation system 212 is connected such that heated water from engine 214 is passed through boiler 216. A coolant water outlet in engine 214 is connected to a water pump 218 by a conduit 220. The outlet of pump 218 is connected to a conduit 222 which passes through boiler 216 for exchanging heat to a refrigerant in boiler 216. A conduit 224 conveys the engine coolant water which has exchanged heat in boiler 216 back to a coolant water inlet in engine 214.

Of course, the refrigerant in boiler 216 could also be heated by the oil circulation system, engine exhaust system or combination of the systems as shown in the embodiment described above.

As with the embodiment described above, refrigerant which is evaporated in boiler 216 is conveyed to the drive inlet of an ejector 226 by a conduit 228. The outlet of ejector 226 is connected to a condenser 230 by a conduit 232. Like the previous embodiments, a bypass conduit 234 is provided from conduit 228 to conduit 232 around ejector 226. Conduit 234 is connected to conduits 228 and 232 by a three-way valve 236. Also shown in FIG. 3 is an excess flow check valve 235 connected to control flow of refrigerant in conduit 234. For the reasons discussed earlier for the embodiment in FIG. 2, check valve 235 could be used in place of three-way valve 236 to save costs and to simplify the control system needed for operating the air conditioning system. An ordinary check valve 262 can be used downstream of excess flow check valve 235 to prevent refrigerant from conduit 232 from flowing into conduit 234 and through valve 235 in the wrong direction. A check valve 238 is placed immediately downstream of ejector 226 to prevent flow from conduit 234 through ejector 226. With the the use of three-way valve 236 instead of check valve 235, flow can be directed from conduit 228 to conduit 232 solely through ejector 226 or, alternatively, from conduit 228 to conduit 232 through conduit 234 thereby bypassing ejector 226.

The outlet of condenser 230 is connected to conduit 240. Conduit 258 connects conduit 240 to the inlet of a drive pump 242. As in the embodiment described above, the outlet of the drive pump 242 is connected to the inlet of boiler 216 by a conduit 144. This conduit 244 directs flow through an ejector cooling jacket 246.

An evaporator 248 is connected by a conduit 150 to conduit 240. An expansion valve 252 is provided on conduit 240 upstream of the connection of conduit 250.

As in the above embodiment, the outlet of evaporator 248 is connected to the suction inlet of ejector 226 by a conduit 256. Flow through evaporator 248 into ejector 226 can be controlled or stopped by control valve 260 connected in conduit 256 upstream of the suction inlet of ejector 226. When no cooling for air conditioning is required in evaporator 248, flow through evaporator 248 can be stopped by closing valve 260, in which case all refrigerant leaving the condenser 230 will pass into drive pump 242.

It can be seen that by proper orientation of valves 236 and 260 and control of the air conditioning fan (not shown) for the evaporator 248, the air conditioning system can be turned on or off. Further, when the air conditioning is off, the condenser 230 operates solely to cool the refrigerant circulated through the boiler and in turn to cool the engine 214. On the other hand, when the air conditioning system is turned on, condenser 230 serves to cool the refrigerant which is expanded and used for refrigeration in evaporator 248 as well as cooling the engine 214.

When no air conditioning is desired, valve 236 is oriented such that refrigerant from boiler 216 passes around ejector 226 through conduit 234 and valve 260 is closed. Therefore, the refrigerant from condenser 230 passes only into pump 242 and bypasses expansion valve 252 and evaporator 248.

When air conditioning is desired, valve 236 is oriented such that refrigerant from boiler 216 passes through ejector 226. Valve 260 is opened to permit flow of refrigerant through expansion valve 252 into evaporator 248.

As described earlier for the system shown in FIG. 2, an excess flow check valve 235 can be connected to control flow in conduit 234 during heat up of the engine 214 and the refrigerant in boiler 216 when the engine 214 is started. This excess flow check valve could replace valve 236. Excess flow check valves are well known and operate to prevent flow in one direction when the flow exceeds a predetermined rate. The excess flow check valve 235 will permit the refrigerant to bypass ejector 226 until the generation rate of refrigerant gas in boiler 216 becomes high enough to prevent liquid refrigerant from overflowing the boiler and the resulting two phase flow from entering ejector 226.

During engine start-up when the refrigerant temperature in boiler 216 is low, pump 242 is actuated even when air conditioning is not desired. When the temperature of the refrigerant in the boiler 216 rises, sufficiently the flow through excess flow check valve 235 will rise to a level causing valve 235 to prevent flow through conduit 234. At this time the flow through ejector 226 can drive the refrigeration cycle to cool evaporator 248. During engine start-up, valve 260 is closed. Once engine temperatures rise to support sufficient refrigerant boiling in boiler 216, valve 260 can be opened if cooling for air conditioning by evaporator 248 is wanted. Valve 260 remains closed whenever air conditioning is not required to reduce the pressure drop for flow through ejector 226.

To provide heating with the system, a heater 266 is provided on conduit 224. Air blown through heater 266 exchanges heat with the heated water and conduit 224 and is directed to the interior of the car.

Obviously, the description of many details in the second embodiment is the same as those described in the first embodiment. The rearrangement of specific items and controls can be made by those skilled in the art. For example, a control system for actuating valves 236 and 260 and air conditioning fan (not shown) for evaporator 248 can be provided by those skilled in the art. Some of the features of the embodiment in FIG. 2 can be used in the embodiment of FIG. 3. These additional features include the blower 88, expansion tank 78, and load pump 74 of FIG. 2 and the associated valving and conduits to connect these components. Also the blower feature could be used without either of the expansion tank and load pump features and vice versa.

One combination of these features could involve using the existing mechanical compressor of an already installed conventional air conditioning system as the blower (even with different refrigerants) to augment the ejector flow and using the existing radiator as the condenser 230 of FIG. 3 with a suitable refrigerant such as refrigerant R-213. The condensing pressure of R-213 at outside air temperatures up to 120° is below the operating pressure rating (15 psi) of most radiators. Also the horsepower to operate the existing mechanical compressor and provide the same amount of air conditioning would be significantly less since the ejector 226 augments the required level of refrigerant gas compression.

Thus the vehicle air conditioning system of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art, which changes are encompassed within the scope and spirit of this invention as defined by the appended claims.

The foregoing disclosure and the showings made in the drawings are merely illustrative of the principles of this invention and are not to be interpreted in a limiting sense.

What is claimed is:

1. An air conditioning system for a vehicle having an engine, an engine exhaust system, and an engine cooling system comprising:

a boiler for heating a refrigerant in a heat exchanging relationship with at least a selected one of said engine exhaust system and said engine cooling system, the boiler having an inlet portion and an outlet portion through which the refrigerant passes;

an ejector having a drive inlet portion, a suction inlet portion, and an outlet portion, the drive inlet portion being in fluid communication with the outlet of said boiler;

a load evaporator in heat exchanging relationshp for air conditioning, the load evaporator having an outlet portion connected to the suction inlet portion of the ejector; and a blower having an inlet portion and an outlet portion, the inlet portion being in fluid communication with the outlet portion of the load evaporator and the outlet portion being in fluid communication with the suction inlet portion of the ejector.

2. The vehicle air conditioning system of claim 1 which further includes means for controlling flow of refrigerant through said blower responsive to the refrigerant condition in said system.

3. The vehicle air conditioning system of claim 1 which further includes an expansion tank having an inlet and an outlet, the inlet being connected to receive refrigerant from said system and the outlet being connected to the suction inlet portion of said ejector.

4. An air conditioning system for a vehicle having an engine, an engine exhaust system, and an engine cooling system comprising:
   a boiler for heating a refrigerant in a heat exchanging relationship with at least a selected one of said engine exhaust and said engine cooling system, the boiler having an inlet portion and an outlet portion through which refrigerant passes;
   an ejector having a drive inlet portion, a suction inlet portion, and an outlet portion, the drive inlet portion being in fluid communication with the outlet of said boiler;
   a bypass conduit connected to convey refrigerant from upstream of the drive inlet portion of said ejector to downstream of the outlet portion of said ejector;
   a bypass flow control means connected to said bypass conduit for controlling flow of refrigerant through said bypass conduit so that refrigerant flow greater than a predetermined level is not permitted through said bypass conduit; and
   a load evaporator disposed in heat exchange relationship for air conditioning, and having an outlet in fluid communication with the suction inlet portion of said ejector.

5. The air conditioning system of claim 4 which further includes means for controlling flow of refrigerant to the suction inlet portion of said ejector.

6. The air conditioning system of claim 4 wherein said bypass flow control means comprises an excess flow control valve connected to control flow through said bypass conduit.

7. An air conditioning and engine cooling system for a vehicle having an engine which produces heat comprising:
   an engine coolant circulation system for conveying engine coolant to and from said engine to exchange heat between said engine and said engine coolant;
   a refrigerant fluid circulation system for circulating a refrigerant fluid of a type other than said engine coolant;
   a boiler connected to said engine coolant circulation system and said refrigerant fluid circulation system such that sufficient heat is exchanged between engine coolant and refrigerant fluid conveyed through said boiler so that the temperature of the engine coolant in said engine coolant circulation system is maintained below a predetermined level without the use of a radiator connected to said engine coolant circulation system;
   an ejector having a drive inlet portion, a suction inlet portion, and an outlet portion, wherein the drive inlet portion is disposed for receiving refrigerant from said refrigerant circulation system downstream of said boiler; and
   a load evaporator disposed in heat exchange relationship for air conditioning, the load evaporator having an inlet and an outlet, the outlet being connected with the suction inlet portion of said ejector.

8. The air conditioning and engine cooling system of claim 7 which further includes:
   means for controlling flow of refrigerant to the suction inlet portion of said ejector.

9. The air conditioning and engine cooling system of claim 7 which further includes:
   a bypass conduit connected to convey refrigerant from upstream of the drive inlet portion of said ejector to downstream of the outlet portion of said ejector; and
   a bypass flow control means connected to said bypass conduit for controlling flow of refrigerant through said bypass conduit so that refrigerant flow greater than a predetermined level is not permitted through said bypass conduit.

10. An air conditioning and engine cooling system for a vehicle having an engine which produces heat comprising:
   an engine coolant circulation system for conveying engine coolant to and from said engine to exchange heat between said engine and said engine coolant;
   a refrigerant circulation system;
   a boiler connected to said engine coolant circulation system and to said refrigerant circulation system such that sufficient heat is exchanged between said engine coolant and said refrigerant conveyed through said evaporator so that the temperature of the engine coolant in said engine circulation system is maintained below a predetermined level without the use of a radiator connected to said engine coolant circulation system;
   an ejector having a drive inlet portion, a suction inlet portion, and an outlet portion, the drive inlet portion being connected for receiving refrigerant from said refrigerant circulation system downstream of said boiler;
   a fan for moving;
   a conventional car radiator connected to said refrigerant circulation system and not said engine coolant circulation system for condensing said refrigerant by the exchange of heat between said refrigerant and air being moved by said fan through said car radiator; and
   a load evaporator disposed in heat exchange relationship for air conditioning, the load evaporator being connected to said refrigerant circulation system downstream of said conventional car radiator.

11. An improved air conditoning system for a vehicle of the type using a refrigerant and having a mechanical compressor with an inlet and an outlet, a load evaporator to provide the air conditioning effect, and a refrigerant condensing means for condensing said refrigerant wherein the vehicle has an engine cooling system and a hot exhaust system, the improvement comprising:
   an ejector having a drive inlet portion, a suction inlet portion connected to the outlet of the mechanical compressor, and an outlet portion connected to the refrigerant condensing means;
   a boiler for heating the refrigerant by a heat exchange connection with at least a selected one of said hot exhaust system and said engine cooling system, said boiler having an outlet connected to the drive inlet portion of the ejector and an inlet; and means for circulating at least a portion of said refrigerant from downstream of said ejector to the inlet of said boiler.

12. The improvement air conditioning system of claim 11 wherein the improvement further comprises:

a bypass conduit connected to convey refrigerant from upstream of said mechanical compressor to the suction inlet portion of said ejector such that the mechanical compressor is bypassed;

valve means connected to said bypass conduit for switching the flow of the refrigerant between a flow which bypasses the mechanical compressor and a flow which does not bypass the mechanical compressor; and bypass control means connected to said valve means and connected to said mechanical compressor to actuate said valve means and said mechanical compressor, said bypass control means being responsive to the condition of refrigerant in said air conditioning system.

13. The improved air conditioning system of claim 11 wherein the improvement further comprises:

means for controlling the flow of refrigerant passing through the mechanical compressor.

14. An air conditioning system for a vehicle having an engine, an engine exhaust system and an engine cooling system comprising:

a drive evaporator for heating a refrigerant disposed in a heat exchange relationship with at least a selected one of said engine exhaust system and said engine cooling system, said boiler having an inlet and an outlet through which the refrigerant passes;

an ejector having a drive inlet portion, a suction inlet portion, and an outlet portion, the drive inlet portion being in fluid communication with the outlet of said boiler;

a load evaporator disposed in heat exhange relationship for air conditioning, and having an outlet in fluid communication with the suction inlet portion of said ejector; and an expansion tank containing liquid and gaseous refrigerant and having an inlet and an outlet, the outlet being in fluid communication with the suction inlet portion of the ejector.

15. The air conditioning system of claim 14 for a vehicle wherein said load evaporator is connected to receive refrigerant from said expansion tank and said expansion tank is connected to receive refrigerant from said load evaporator, and which further comprises a load pump connected for circulating refrigerant to and from said load evaporator and said expansion tank.

16. The air conditioning system of claim 14 for a vehicle which further comprises a blower having an inlet and an outlet, the inlet being connected to the outlet of said expansion tank and the outlet being connected to the suction inlet portion of said ejector.

17. An air conditioning system for a vehicle having an engine exhaust system and an engine coolant system, comprising:

a boiler for heating a refrigerant disposed in a heat exchange relationship with at least a selected one of said engine exhaust system and said engine cooling system, the boiler having an inlet and an outlet through which the refrigerant passes;

an ejector having a drive inlet portion, a suction inlet portion and an outlet portion, the drive inlet portion being connected to the outlet of said boiler;

a load evaporator disposed in heat exchange relationship for air conditioning, and having an outlet connected to the suction inlet portion of said ejector;

refrigerant pressure increasing means for increasing the pressure of refrigerant to a pressure greater than the pressure of refrigerant at the outlet portion of said ejector, said pressure increasing means being connected downstream of the outlet portion of said ejector;

ejector refrigerant cooling means for cooling the refrigerant in the ejector using refrigerant conveyed from said refrigerant pressure increasing means.

18. An air conditioning system for a vehicle having an engine, an engine exhaust system and an engine cooling system comprising:

a boiler for heating a refrigerant disposed in a heat exchange relationship with at least a selected one of said engine exhaust system and said cooling system, the drive evaporator having an inlet and an outlet, through which the refrigerant passes;

an ejector having a drive inlet portion, a suction inlet portion, and an outlet portion, the drive inlet portion being in fluid communication with the outlet of said boiler;

a load evaporator disposed in heat exchange relationship for air conditioning, and having an outlet in fluid communication with the suction inlet portion of said ejector;

ejector refrigerant cooling means for cooling the refrigerant in the ejector using refrigerant conveyed from a portion of the said air conditioning system which contains at least some liquid refrigerant.

19. The air conditioning of claim 18 which further comprises:

refrigerant pressure increasing means for increasing the pressure of refrigerant to a pressure greater than the presure of refrigerant at the outlet portion of said expansion means, and connected upstream of said means for cooling refrigerant in the ejector.

* * * * *

UNITED STATES PATENT AND TRADEMARK OFFICE
CERTIFICATE OF CORRECTION

PATENT NO. : 4,523,437

DATED : June 18, 1985

INVENTOR(S) : Patrick B. Briley

It is certified that error appears in the above-identified patent and that said Letters Patent are hereby corrected as shown below:

Column 2, line 2, delete "to" and insert --by--.

Column 10, line 21, delete "44" and insert --230--.

Column 11, line 7, delete "144" and insert --244--.

Column 11, line 9, delete "150" and insert --250--.

Column 11, line 60, delete the comma after rises and insert a comma after sufficiently.

Column 12, line 28, delete "R-213" (twice) and insert --R-113-- (twice).

Claim 10, column 14, line 34, delete "evaporator" and insert --boiler--.

Claim 10, column 14, line 44, insert --air-- after "moving."

UNITED STATES PATENT AND TRADEMARK OFFICE
CERTIFICATE OF CORRECTION

PATENT NO. : 4,523,437
DATED : June 18, 1985
INVENTOR(S) : Patrick B. Briley

It is certified that error appears in the above-identified patent and that said Letters Patent are hereby corrected as shown below:

Claim 12, column 15, line 6, delete "improvement" and insert --improved--.

Claim 14, column 15, line 30, delete "drive evaporator" and insert --boiler--.

Claim 19, column 16, line 49, insert --system-- after "conditioning."

Signed and Sealed this

Twenty-ninth Day of October 1985

[SEAL]

*Attest:*

*Attesting Officer*

DONALD J. QUIGG

*Commissioner of Patents and Trademarks—Designate*